(12) United States Patent
Paterson et al.

(10) Patent No.: US 12,365,070 B2
(45) Date of Patent: Jul. 22, 2025

(54) EXHAUST VALVES FOR PRESSURISED FLUID OPERATED DEVICES

(71) Applicant: Globalforce IP Limited, Ponsonby (NZ)

(72) Inventors: Ian Craig Paterson, Auckland (NZ); William Michael Duff, Lynmouth (NZ)

(73) Assignee: Globalforce IP Limited, Auckland (NZ)

( * ) Notice: Subject to any disclaimer, the term of this patent is extended or adjusted under 35 U.S.C. 154(b) by 256 days.

(21) Appl. No.: 17/797,385

(22) PCT Filed: Aug. 4, 2020

(86) PCT No.: PCT/NZ2020/050084
§ 371 (c)(1),
(2) Date: Aug. 3, 2022

(87) PCT Pub. No.: WO2021/158125
PCT Pub. Date: Aug. 12, 2021

(65) Prior Publication Data
US 2023/0078504 A1 Mar. 16, 2023

Related U.S. Application Data

(60) Provisional application No. 62/986,563, filed on Mar. 6, 2020.

(30) Foreign Application Priority Data
Feb. 3, 2020 (NZ) ........................................ 761370

(51) Int. Cl.
*B25C 1/04* (2006.01)
*B25D 9/20* (2006.01)
(Continued)

(52) U.S. Cl.
CPC ................ *B25C 1/043* (2013.01); *B25D 9/20* (2013.01); *F15B 13/027* (2013.01); *F15B 15/20* (2013.01);
(Continued)

(58) Field of Classification Search
CPC ........... B25C 1/042; B25C 1/043; B25C 1/04; B25D 9/20
See application file for complete search history.

(56) References Cited

U.S. PATENT DOCUMENTS 3,363,517 A 1/1968 Powers
3,494,530 A 2/1970 Bade
(Continued)

FOREIGN PATENT DOCUMENTS

JP H108112779 A 5/1996
JP 2011056648 A 3/2011
(Continued)

OTHER PUBLICATIONS

Written Opinion, issued in International Application No. PCT/NZ2020/050084 by the International Bureau on Nov. 25, 2020.
(Continued)

*Primary Examiner* — Abiy Teka
(74) *Attorney, Agent, or Firm* — Lowe Graham Jones PLLC; Ellen M. Bierman

(57) ABSTRACT

Disclosed is a device including an exhaust valve, that operates on a pressurised working fluid. The device includes a working chamber, defined at least in part by a side wall, which working chamber can hold a workload to or toward a first end thereof, the working chamber to receive the working fluid to act on a rear surface of the workload to propel the workload to or towards a second end, opposite the first, of the working chamber. The device also includes a return chamber to receive fluid under pressure from a front surface
(Continued)

of the workload, the pressure developed at least in part by the movement of the workload towards the second end. Present also is an exhaust valve fluidly connected to the return chamber, the exhaust valve normally biased closed preventing working fluid from exiting the working chamber, but on receipt of, and action by, the fluid under pressure from the return chamber, will open to allow the working fluid to exhaust the working chamber to a lower pressure location, the working fluid exhausting via the side wall of the working chamber through to the exhaust valve. Provided then is a device that will remove or reduce pressure building on the rear surface of the workload when moved from the second end to the first end.

20 Claims, 11 Drawing Sheets

(51) Int. Cl.
| | |
|---|---|
| F15B 13/02 | (2006.01) |
| F15B 15/20 | (2006.01) |
| F16K 31/163 | (2006.01) |
| B25D 9/08 | (2006.01) |
| F41B 11/72 | (2013.01) |

(52) U.S. Cl.
CPC ............ *F16K 31/163* (2013.01); *B25C 1/047* (2013.01); *B25D 9/08* (2013.01); *B25D 2250/181* (2013.01); *F41B 11/72* (2013.01)

(56) References Cited

U.S. PATENT DOCUMENTS

| | | | |
|---|---|---|---|
| 5,873,510 A * | 2/1999 | Hirai | ..................... B25C 1/043 227/8 |
| 2010/0038398 A1* | 2/2010 | Liang | ..................... B25C 1/043 227/8 |

FOREIGN PATENT DOCUMENTS

| | | |
|---|---|---|
| TW | 1608911 B | 12/2017 |
| WO | 2013/145685 A1 | 10/2013 |

OTHER PUBLICATIONS

International Search Report, issued in International Application No. PCT/NZ2020/050084 by the International Bureau on Nov. 25, 2020.

* cited by examiner

EXHAUST VALVES FOR PRESSURISED FLUID OPERATED DEVICES

CROSS-REFERENCE TO RELATED APPLICATIONS

This application is 371 U.S. National Phase Application of PCT/NZ2020/050084, entitled "IMPROVEMENT IN, OR RELATING TO, EXHAUST VALVES FOR PRESSURISED FLUID OPERATED DEVICES, filed Aug. 4, 2020, which claims priority to New Zealand Application No. 2020761370, filed Feb. 3, 2020, and which claims the benefit of U.S. Provisional Application No. 62/986,563, filed Mar. 6, 2020, which applications are incorporated herein by reference in their entireties.

TECHNICAL FIELD OF THE INVENTION

The present invention relates to exhaust, valving and triggering for pressurised fluid powered devices.

In particular, though not solely, the present invention is directed to apparatus and methods for exhaust valving and triggering for pressurised fluid powered devices, whether high or low pressure and triggering the device.

BACKGROUND OF THE INVENTION

There are pressure systems that use a fluid, for example air or another gas, or a liquid, whether high or low pressure, to drive a work load. The work load may be a reciprocating piston, an ejected projectile or the pressure acts on an item or material with a pressure pulse. In such applications there is the need to introduce the pressurised fluid into a region that can do the work on the workload, for example a working chamber. One such method to introduce the pressurised fluid to the workload is through a valve, that directly or indirectly isolates the workload from a reservoir and the pressurised fluid source. The valve opens under action of an event, for example triggering by an external signal. Event or valve transfers the amount of high pressure fluid to the workload, and then closes again, the high pressure fluid then does work. For example the high pressure fluid may then expand to drive the work load down the work chamber.

In high pressure applications opening the valve is complex. The forces acting can be very large, and the time frames to open such valving are very small. This must all be done in a controlled repeatable manner to provide a reliable and efficient system that does the most work from the lowest volume or mass of high pressure fluid.

There is then the need to exhaust pressure that may build up or is left over from behind the work load once the work is done, and or before the next cycle of work can occur.

For example, but not limited to, when the working chamber is a closed volume and the workload is a reciprocating piston within that chamber. Even in very efficient systems, when nearly all the pressure in the working fluid is utilised as work on the workload, for example sending the piston down to a far end of the work chamber, there may still be residual pressure behind the work load. This residual pressure will prevent or slow the return of the workload, for example the piston, back down the chamber to begin the next cycle of work.

In another example all the pressure from working fluid may be utilised, but pressure builds up as the workload returns. This may happen in a closed volume working chamber with a piston, or when open ended and for example a projectile is front loaded into the chamber and pushed down into the chamber. In the example where the working chamber may be open ended, it needs to vent pressure behind the workload, for example a projectile, as it is inserted down into the working chamber prior to being acted on by the pressurised fluid.

The need to exhaust that pressure is to enable the workload to either return to the ready to "fire" position, or to allow insertion of the workload into the working chamber with minimal resistance. In other words, return, or insertion, of the workload will produce an increased pressure as the volume that fluid occupies decreases as the workload is moved to the ready position.

An example of such an exhaust valve to reduce this "back pressure" is that which exhausts through the inlet valve to atmosphere or ambient when a port is opened by a member, that opens the inlet valve, being retracted to its starting position, for example by using the residual pressurised fluid behind the workload. However, combining such opening member with the need to reveal an exhaust port requires higher loading in some situations than desired as the opening member may be forced back against a spring or similar, which has sufficient force to also fire the opening member. In this application, the return of the workload may be impeded. In such an application, also the exhaust port may be open while the pressurised fluid is still doing work on the workload. This results in an inefficient use of the charge of the pressurised fluid as high pressures are then vented to atmosphere, ambient or similar low pressure, rather than performing work on the workload. Also, whilst a simple solution, it creates complicated sealing and manufacturing and makes the overall assembly less compact.

A further exhaust solution is known that that avoids the high force and some of the inefficiency issues associated with opening an exhaust valve while the working fluid is still potentially acting on the work load. However, this is mechanically complex and requires numerous sealing elements and other manufacturing and assembly issues and overall is a less compact solution.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved exhaust valve for a pressurised fluid engine or device, or to provide a low pressure force opening of an exhaust valve for a pressurised fluid engine, or to overcome the above shortcomings or address the above desiderata, or to at least provide the public with a useful choice.

BRIEF DESCRIPTION OF THE INVENTION

In a first aspect the present invention consists in a device including an exhaust valve, that operates on a pressurised working fluid, comprising or including, A working chamber, defined at least in part by a side wall, which working chamber can hold a workload to or toward a first end thereof, the working chamber to receive the working fluid to act on a rear surface of the workload to propel the workload to or towards a second end, opposite the first, of the working chamber, A return chamber to receive fluid under pressure from a front surface of the workload, the pressure developed at least in part by the movement of the workload towards the second end, An exhaust valve fluidly connected to the return chamber, the exhaust valve normally biased closed preventing working fluid from exiting the working chamber, but on receipt of, and action by, the fluid under pressure from the return chamber, will open to allow the working fluid to exhaust the working chamber to a lower pressure location, the working fluid exhausting via the side wall of the working chamber through to the exhaust valve, Wherein a device is provided that will remove or reduce pressure building on the rear surface of the workload when moved from the second end to the first end.

Preferably the exhaust valve exhausts the working fluid at an angle that is not parallel to a longitudinal axis running between the first end and the second end, rather than substantially parallel to the longitudinal axis.

Preferably the exhaust from the working chamber is at or near to a right angle relative to the longitudinal axis.

Preferably the exhaust valve defines at least in part, an exhaust chamber along the flow path from the side wall through the exhaust valve, before the exhaust to the lower pressure.

Preferably a net force acts on the exhaust valve to overcome or increase the bias closed, the net force created from either of both of varying effective pressure areas or pressure, on a first side of the exhaust valve, in fluid communication with the rear surface and/or a second side of the exhaust valve, in fluid communication with the front surface.

Preferably the net force varies with time.

Preferably the exhaust valve slides parallel to the longitudinal axis.

Preferably the working fluid flowing from the working chamber into the exhaust chamber, results in an exhaust chamber pressure which holds the exhaust valve open.

Preferably the fluid connection ports, or the summation of those ports, which connect the working chamber to the exhaust chamber are not of the same size or flow capacity as the ports which connect the exhaust chamber to lower pressure, resulting in different flow capacity into and out of the exhaust chamber.

Preferably the lower pressure is ambient.

Preferably there is a check valve from the lower pressure into the return chamber.

Preferably the check valve opens if there is a pressure imbalance between the front of the workload and the rear of the workload when the exhaust valve is open.

Preferably the check valve in located in the exhaust valve, between the exhaust chamber and the return chamber.

Preferably the check valve is provided by an o-ring, x-ring, lip seal, piston ring or other continuous, variable, or interrupted cross section sealing element, flexible or otherwise that moves to block flow from the return chamber into the exhaust chamber, but allows flow from the exhaust chamber into the return chamber.

Preferably the check valve opens when the pressure in the exhaust chamber exceeds that of the return chamber, in so doing the exhaust chamber pressure can then recirculate and act on the front face of the work load to help drive it back toward the first end.

Preferably the return chamber is located externally of, and surrounding, the working chamber.

Preferably the workload is captive within the working chamber, for example a piston or similar, or is not captive and is expelled from the working chamber, for example a projectile or similar, or is a pressure wave within the working chamber to otherwise perform work.

Preferably the exhaust valve is at or towards the first end.

Preferably the exhaust valve is an annular ring that can translate along the longitudinal axis.

Preferably the ring lies outside the working chamber.

Preferably the return chamber receives the fluid under pressure from the working chamber via at least one fluid connection therebetween.

Preferably a first of the at least one fluid connection is at or toward a second end of the working chamber.

Preferably a second of the at least one fluid connection is between the first end and the first fluid connection.

Preferably the second fluid connection includes a one way valve from the working chamber to the return chamber.

Preferably there is a baffle within the return chamber, between a working face of the exhaust valve and the receipt of fluid from the working chamber.

Preferably there is one or more apertures in the baffle to slow the development of pressure against the working face compared to the development of pressure on the opposing side of the baffle.

Preferably there is a working fluid driven hammer that impacts a dose valve to deliver working fluid to the working chamber from a dose chamber.

Preferably the hammer is driven to impact the dose valve by a higher pressure of working fluid in a driven chamber on one side of the hammer, separated by a hammer piston, from a trigger chamber.

Preferably the hammer is held in place by an equal pressure or resultant force between the trigger chamber and the driven chamber.

Preferably the resultant force is at least in part provided by a bias, such as a spring.

Preferably the working fluid to drive the hammer comes from the dose chamber.

Preferably the working fluid to balance the driven chamber is selectively delivered from the dose chamber.

Preferably dumping the working fluid from the trigger chamber allows the hammer to be driven into the dose valve under action of the pressure in the driven chamber.

Preferably a spool valve when slid in a first direction dumps the working fluid from the trigger chamber to fire the device, and when slide in a second direction, opposite the first, dumps the working fluid from the dose chamber to make the device safe.

In another aspect the present invention consists in a method of providing an exhaust valve in a pressure fluid device, comprising or including the steps of, Driving a working load, within a working chamber, from a first end of the working chamber to or towards an opposing, second end of the working chamber, using a pressurised fluid on a rear surface of the workload, Receiving pressure into a return chamber from a front surface of the workload, the pressure formed at least in part as a result of the workload moving down the working chamber towards the second end, Opening an exhaust valve, as a result of the pressure in the return chamber, acting on a working face of the exhaust valve, the exhaust valve, when opened allowing working fluid in the working chamber present on the rear surface to exhaust from the working chamber to a lower pressure location, the working fluid exiting via the side wall of the working chamber through to the exhaust valve, To allow a reduced pressure in front of the workload when moving from the second end to, or toward, the first end.

Preferably the exhaust valve exhausts the working fluid at an angle that is not parallel to a longitudinal axis running between the first end and the second end, rather than substantially parallel to the longitudinal axis.

Preferably the exhaust from the working chamber is at or near to a right angle relative to the longitudinal axis.

Preferably the exhaust valve defines at least in part, an exhaust chamber along the flow path from the side wall through the exhaust valve, before the exhaust to the lower pressure.

Preferably an exhaust chamber face and the working face are different in area from each other, allowing a force to be realised on the exhaust valve based on the pressure in the exhaust chamber.

Preferably the exhaust chamber face is at least in part achieved by the sealing of the exhaust valve front and back, and on the inner and outer diameters.

Preferably working fluid flowing from the working chamber into the exhaust chamber, resulting in an exhaust chamber pressure, which holds the exhaust valve open.

Preferably the fluid connection ports, or the summation of those ports, which connect the working chamber to the exhaust chamber are not of the same size or flow capacity as the ports which connect the exhaust chamber to lower pressure, resulting in different flow capacity into and out of the exhaust chamber.

Preferably the lower pressure is ambient.

Preferably there is a check valve from the lower pressure into the return chamber.

Preferably the check valve opens if there is a pressure imbalance between the front of the workload and the rear of the workload when the exhaust valve is open.

Preferably the check valve is located in the exhaust valve, between the exhaust chamber and the return chamber.

Preferably the check valve is provided by an o-ring x-ring, lip seal, or other continuous or variable cross section sealing element that moves to block flow from the return chamber into the exhaust chamber, but allows flow from the exhaust chamber into the return chamber.

Preferably the check valve opens when the pressure in the exhaust chamber exceeds that of the return chamber, in so doing the exhaust chamber pressure can then recirculate and act on the front face of the work load to help drive it back to the first end.

Preferably the return chamber is located externally and surrounding the working chamber.

Preferably the workload is captive within the working chamber, such as, but not limited to a piston, or is not captive and is expelled from the working chamber, such as, but not limited to a projectile or, or is a pressure wave within the working chamber to otherwise perform work.

Preferably the exhaust valve is at or towards the first end.

Preferably the exhaust valve is an annular ring that can translate along the longitudinal axis running from the first end to the second end.

Preferably the longitudinal axis is a major axis of the working chamber.

Preferably the ring lies outside the working chamber.

Preferably the return chamber receives the fluid under pressure from the working chamber via at least one fluid connection therebetween.

Preferably a first of the at least one fluid connection is at or toward a second end of the working chamber.

Preferably a second of the at least one fluid connection is between the first end and the first fluid connection.

Preferably the second fluid connection includes a one way valve from the working chamber to the return chamber.

Preferably there is a baffle within the return chamber, between the working face of the exhaust valve and the receipt of fluid from the working chamber.

Preferably there is one or more apertures in the baffle to slow the development of pressure against the working face compared to the development of pressure on the opposing side of the baffle.

Preferably there is a working fluid driven hammer that impacts a dose valve to deliver working fluid to the working chamber.

Preferably the hammer is driven to impact the dose valve by a higher pressure of working fluid in a driven chamber on one side of the hammer, separated by a hammer piston, from a trigger chamber.

Preferably the hammer is held in place by an equal pressure or resultant force between the trigger chamber and the driven chamber.

Preferably the resultant force is at least in part provided by a bias, such as a spring.

Preferably dumping the working fluid from the trigger chamber allows the hammer to be driven into the dose valve.

In another aspect the present invention consists in a device including an exhaust valve as described herein with reference to any one or more of the accompanying drawings.

In another aspect the present invention consists in a method of providing an exhaust valve in a pressure fluid device as described herein with reference to any one or more of the accompanying drawings.

In another aspect the present invention consists in an actuation trigger for a device, comprising or including, A dose chamber to hold a charge of high pressure working fluid, received from a high pressure source, A dose valve, normally biased closed to seal the dose chamber off from a working chamber, and hold the charge in the dose chamber, A hammer operated by a piston with a driven chamber on a first side of the piston, and a trigger chamber on a second side of the piston, sealed from the first side, the driven chamber receiving high pressure fluid from the dose chamber, A trigger valve to selectively supply high pressure fluid to the trigger chamber, or to release high pressure fluid from the trigger chamber, Such that when the hammer has high pressure fluid in both the driven chamber and the trigger chamber it is held in a force balance in a first position, and when the high pressure fluid is released from the trigger chamber, the hammer is driven to, or towards a second position towards the trigger chamber, The hammer, when driven to, or towards the second position strikes the dose valve, unseating the dose valve to unseal the dose chamber and the working chamber thus allowing the charge to enter the working chamber to do work therein.

Preferably the trigger valve can also release the charge from the dose chamber to make to prevent firing of the device/work being done by the device.

Preferably the trigger valve is a sliding spool valve.

Preferably the trigger valve has at least four positions,

A first position to charge the dose chamber from the high pressure source

A second position to charge both the driven chamber and the trigger chamber with high pressure fluid and hold the hammer in a force balance, A third position where the high pressure fluid in the trigger chamber is released, A fourth position where the charge in the dose chamber is release.

Preferably the trigger chamber is charged from the dose chamber.

Preferably the hammer slides along a first sliding axis and the dose valve slides along a second sliding axis.

Preferably the first sliding axis and second sliding are parallel or concentric.

Preferably the dose valve is an annular ring that has an annular ring sealing surface to seal off the dose chamber from the working chamber.

Preferably the dose valve is biased closed by a spring.

Preferably the hammer has an elastic element on the first and or second side to aid the force balance.

Preferably the hammer is returned to, or toward the first position, at least in part by the dose valve or a return of high pressure fluid to the trigger chamber.

Preferably the workload is captive within the working chamber, for example a piston or similar, or is not captive and is expelled from the working chamber, for example a projectile or similar, or is a pressure wave within the working chamber to otherwise perform work.

In another aspect the present invention consists in a device, comprising or including,
- A dose chamber to hold a charge of high pressure working fluid, received from a high pressure source,
- A dose valve, normally biased closed to seal the dose chamber off from a working chamber, and hold the charge in the dose chamber,
- A hammer operated by a piston with a driven chamber on a first side of the piston, and a trigger chamber on a second side of the piston, sealed from the first side, the driven chamber receiving high pressure fluid from the dose chamber,
- A trigger valve to selectively supply high pressure fluid to the trigger chamber from the dose chamber, or to release high pressure fluid from the trigger chamber,
- Such that when the hammer has high pressure fluid in both the driven chamber and the trigger chamber it is held in a force balance in a first position, and when the high pressure fluid is released from the trigger chamber, the hammer is driven to, or towards a second position towards the trigger chamber,
- The hammer, when driven to, or towards the second position strikes the dose valve, unseating the dose valve to unseal the dose chamber and the working chamber thus allowing the charge to enter the working chamber to do work therein.

In another aspect the present invention consists in a high pressure fluid operating system, comprising or including,
- A dose chamber to hold a charge of high pressure fluid, the dose chamber in fluid communication with a first side of a piston operatively connected to a hammer, and the dose chamber in selective fluid communication with a second side of the piston,
- The piston in a force balance in a first position when supplied with high pressure fluid on both the first side and the second side, the piston unbalanced when high pressure is selectively removed from the second side of the piston and is urged to move to, or towards a second position to do work.

Preferably the hammer works on a dose valve when moving to, or towards the second position, to unseat the dose valve and allow a charge of high pressure fluid to move from the dose chamber into the working chamber, the charge thereafter to do work in the working chamber.

Preferably there are elastic elements on either, or both the first or second sides.

Preferably the high pressure fluid is a compressible fluid.

Preferably the high pressure fluid is in a range of 15 bar to 90 bar.

Preferably the high pressure fluid is in a range of 20 to 60 bar.

Preferably the high pressure fluid is adjusted within the range to tune the power of the device.

Preferably the fluid is a gas.

In another aspect the present invention consists in a method of actuating a device, comprising or including the steps of,
- Charging a dose chamber with a charge of high pressure fluid,
- Charging a driven chamber on a first side of a hammer, with a high pressure fluid,
- Charging a trigger chamber on a second side of the hammer with a high pressure fluid, the first side an second side separated by a piston operatively connected to the hammer, (switch), such that the hammer is held in a force balance in a first position,
- Releasing the high pressure fluid from the trigger chamber to drive the hammer to, or towards a second position,
- Actuating a dose valve by the hammer impacting thereon to unseat the dose valve from a sealing position, where the dose valve seals the dose chamber from a working chamber, to an unsealed position such that the charge enters the working chamber to do work therein.

Preferably returning the hammer to, or towards the first position, at least in part by the dose valve or a return of high pressure fluid to the trigger chamber.

Preferably the drive chamber is charged from the dose chamber.

Preferably the trigger chamber is selectively charged from the dose chamber, or released via a trigger valve.

Preferably the trigger valve is a sliding spool valve.

Preferably the trigger valve can release the charge from the dose chamber to make to prevent firing of the/work being done by the device.

In another aspect the resent invention consists in an actuation trigger for a device as herein described with reference to any one or more of the accompanying drawings.

In another aspect the resent invention consists in a device as herein described with reference to any one or more of the accompanying drawings.

In another aspect the resent invention consists in a high pressure fluid operating system as herein described with reference to any one or more of the accompanying drawings.

In another aspect the resent invention consists in a method of actuating a device as herein described with reference to any one or more of the accompanying drawings.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification which include that term, the features, prefaced by that term in each statement, all need to be present, but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference.

This invention may also be said broadly to consist in the parts, elements and features referred to or indicated in the specification of the application, individually or collectively, and any or all combinations of any two or more of said parts, elements and features, and where specific integers are mentioned herein which have known equivalents in the art to which this invention relates, such known equivalents are deemed to be incorporated herein as if individually set forth.

Other aspects of the invention may become apparent from the following description which is given by way of example only and with reference to the accompanying drawings.

BRIEF DESCRIPTION OF THE DRAWINGS

Preferred forms of the present invention will now be described with reference to the accompanying drawings in which.

DETAILED DESCRIPTION OF THE INVENTION

Preferred embodiments of the invention will now be described with reference to FIGS. 1 through 11.

Figure 1:
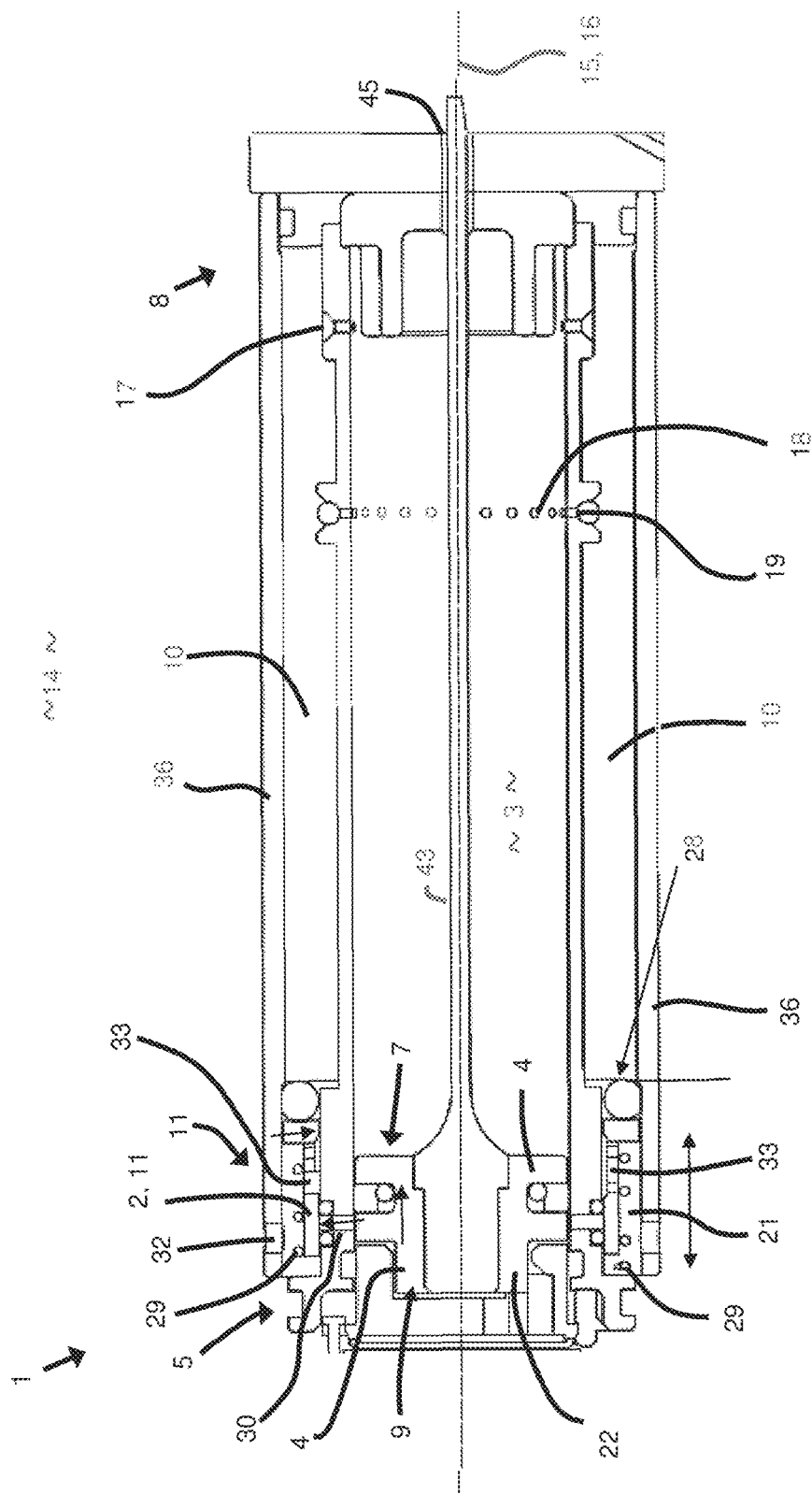
FIG. 1 Shows a vertical cross section through a pressurised fluid powered device that includes an exhaust valve in keeping with the present invention, the exhaust valve closed, the workload is to or towards the first end ready to be worked on, FIG. 2 Shows a similar view to that of FIG. 1, where the workload has moved down the working chamber under action of the working fluid, and pressure as a result of this movement has activated the exhaust valve to open, FIG. 3A Shows a similar view to FIG. 1 with detail of a check valve into the return chamber, to reduce pressure differential between the front and back of the work load, to enable better return stroke of the workload in the ready state with the check valve closed, FIG. 3B just as the workload begins to move down the working chamber the check valve is closed, and FIG. 3C the work load is moving back up the chamber and if there is any pressure differential between the front of the workload, and the rear, the check valve will open, FIG. 3D showing in isometric a reed valve to perform the check valve function.

A device 1 that operates on pressurised fluid is shown in FIG. 1 as a first embodiment, the example shown is from a nail or fastening gun. The device 1 consists of a workload 4 that is received in a working chamber 3. The working chamber is in part defined by a side wall 31. In this example the working chamber is of constant cross section and is cylindrical, incorporating the side wall 31. However, the working chamber 3 may be of difference cross-section to circular and may take any shape necessary for example, but not limited to oval, square or other shape. In most instances the working chamber will be of constant cross section along its length. However in some specialist applications, it may change cross section and the work load will be able to adapt to this change in cross section.

The workload 4 may be a piston as shown, for example as used in a fastening gun such as for nails, or used in a pest control trap, and is therefore captive. Alternatively the workload 4 may be non-captive such as a projectile or similar that is ejected from the working chamber 3. In the examples shown the workload 4 is a piston 22, that also carries a striker or anvil 43. The striker or anvil 43 may do work on a fastener, for example a nail, as a result of travel of the workload 4. Alternatively the striker may be of a different form to achieve a different result, for example it may be flat or otherwise contoured to act to dispatch a pest or similar by delivering energy into an organic or inorganic body.

The working chamber 3 and device 1 have a first end 5 and a second end 8, and the workload 4 has a rear surface 9 and a front surface 7. The workload 4 in doing work moves from the first end 5 to the second end 8.

As shown, there is a return chamber 10. In the preferred form, as shown, the return chamber 10 is annular and surrounds the working chamber 3. In this arrangement the outer or external surface of the side wall 31 defines part of the return chamber 10 as shown for example in FIG. 2. However, the return chamber 10 may take other forms and may only partially encircle the working chamber 3, may not be defined in part by the side wall, or may be separate there from. For example, though not shown, the return chamber may be a separate volume that is only fluidly attached to the working chamber by a conduit, flexible or otherwise.

The return chamber 10 is in fluid communication with the working chamber 4, at least from near the second end 8. In the example shown there are two paths of fluid communication, a first fluid communication 17 adjacent or toward the second end 8, and a second fluid communication 18 intermediate the second end 8 and the first end 5.

Fluidly connected to the return chamber 10 is the working face 28 of an exhaust valve 2, as shown in FIG. 1. A valve member 37, for example an o-ring 34 as see in FIG. 2 forms part of the working face 28. In the examples shown the exhaust valve 2 is annular and can slide back and force along a valve sliding axis, in this case that is the longitudinal axis 15 of the device. The longitudinal axis in this case is an axis parallel to the line of motion, or sliding axis of the work load. In the embodiment shown, this also happens to be the central, major axis of the working chamber. The working face 28 is that face, or those faces with a surface normal parallel to the valve sliding axis, in this example the longitudinal axis 15, as these are the faces on which a pressure acting will produce a resultant force in the direction of valve sliding axis of the exhaust valve. Said another way, the working faces are those that lie in a plane perpendicular to the valve sliding axis of the exhaust valve.

However in other forms the exhaust valve 2 need not be an annular ring, and only need be fluidly connected to perform the exhaust valve function as described. For example the exhaust valve could be fluidly connected as described here to perform the same functions, but not physically connected to the main body, but could be, and could be a spool valve or similar.

The exhaust valve 2 is normally biased closed by a bias 29 such as a spring as seen in FIG. 1. The exhaust valve 2 in the closed position 11, as seen in FIG. 1, closes an exit 30 in the side wall 31 of the working chamber 3. Thus the exit or exhaust from the working chamber 3 for this and the other embodiments is through a side wall at or near a right angle to the longitudinal axis of the device 1, or at least not parallel to the longitudinal axis.

In the embodiment shown, and preferably in all embodiments the exhaust valve 2 receives the exhaust through the side wall 31 of the working chamber 3, and preferably the exhaust then exits through a side of the device 1 via exhaust port 32. However, in other forms the exit of the exhaust may be through another region of the device[DS1], but at least exits out the side wall of the working chamber However, the exhaust valve 2 may be a separate valving arrangement actuated from the return chamber 10. For example, though not shown, it may be a separate annular piston valve, or other type of valve, for example a spool valve acting in a parallel with, or at an angle to the working chamber 3 or return chamber 10. Similarly, while the return chamber is shown as an annular chamber around the working chamber, this may also be a separate volume in turn connected to the exhaust valve as mentioned above. Such an arrangement may be desirable for many reasons, for example, but not limited to, when the arrangement does not need to be as compact, or the space confines prevent it.

Figure 2:
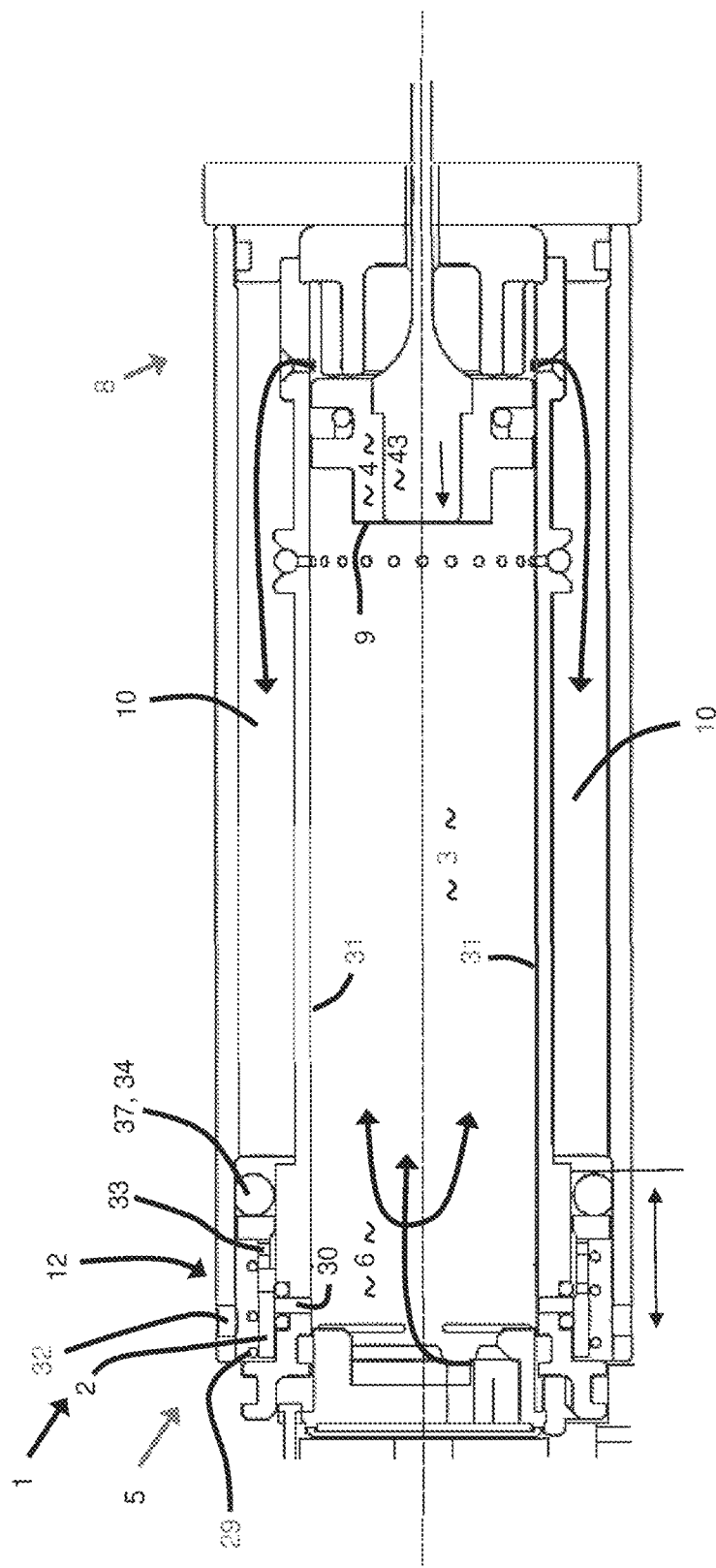

The exhaust valve 2 when in the open position 12 as shown in FIG. 2, slid to the left when compared to the exhaust valve 2 position of FIG. 1, provides an exit or flow path from the working chamber 3, via the exit 30, through the exhaust valve port 33 to the exhaust 32, as shown by the arrow. In the preferred form the exhaust 32 is at, or exhausts to, a lower pressure, for example to the atmosphere or ambient surroundings 14. The exhaust 32 as shown here is an aperture in the housing 36 of the device 1.

In some instances, as the workload moves or returns to the first end 5 to the ready position there may be a lower pressure on the front surface 7 compared to the rear surface 9, that is a pressure difference in favour of the rear surface 9. This is particularly the case where the work load moves at high speed, and the dynamic effects of the working fluid prevent pressure equalisation or leaks that would otherwise occur in slow speed operation.

This pressure difference would resist the movement of the workload 4 to the first end 5. This is because as the workload 4 moves back to the first end 5 the working fluid there is trapped and compressed with the workload 4 movement. As the return chamber 10 and front surface 7 are a normally closed volume, this will reduce the consistency of return to the ready position at the first end 5, at least the speed of return, and may even prevent return of the workload completely.

As shown in FIGS. 3A through 3D, in such a case there may be a one way or check valve 23, such as the reed valve 24 shown. The reed valve, being an elastic ring of flat cross section as shown, is biased outwardly by its own elastic properties to normally close chamber port 35. This allows the lower pressure outside the return chamber 10, or at least behind the front surface 7 to equalise through chamber port 35 into the return chamber 10 and to the front surface 7 to even out any pressure imbalance with the rear surface 9. The valve 24 is tuned or selected so it opens at the desired pressure difference.

Figure 5:
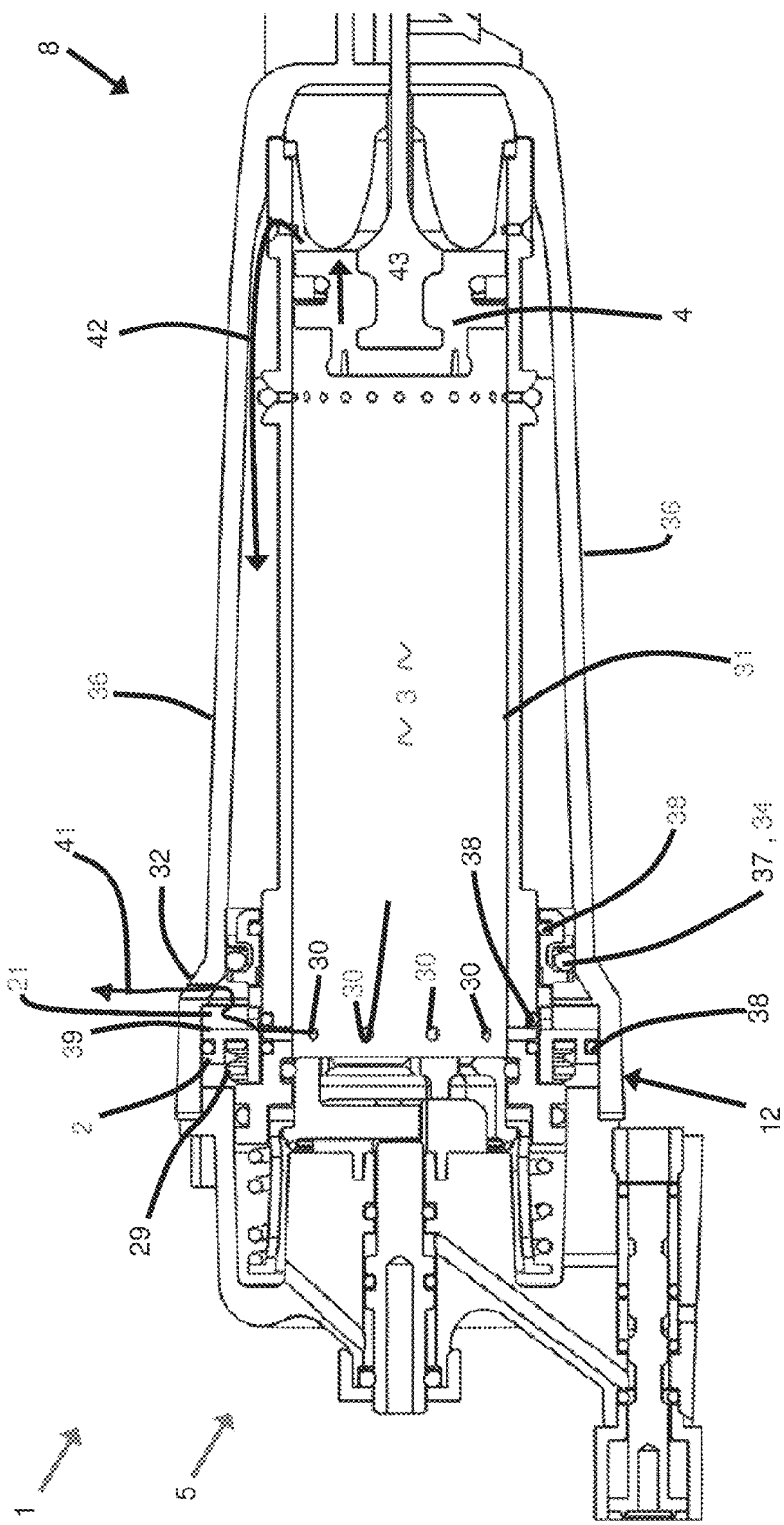
FIG. 5 shows a similar view to FIG. 4 but where the workload has been sent down the working chamber towards the second end, and the exhaust valve is opened under action of pressure in the return chamber, to allow pressure behind the workload to exhaust to atmosphere or ambient, the exhaust port from the side of the working chamber being clearly visible.
Figure 6:
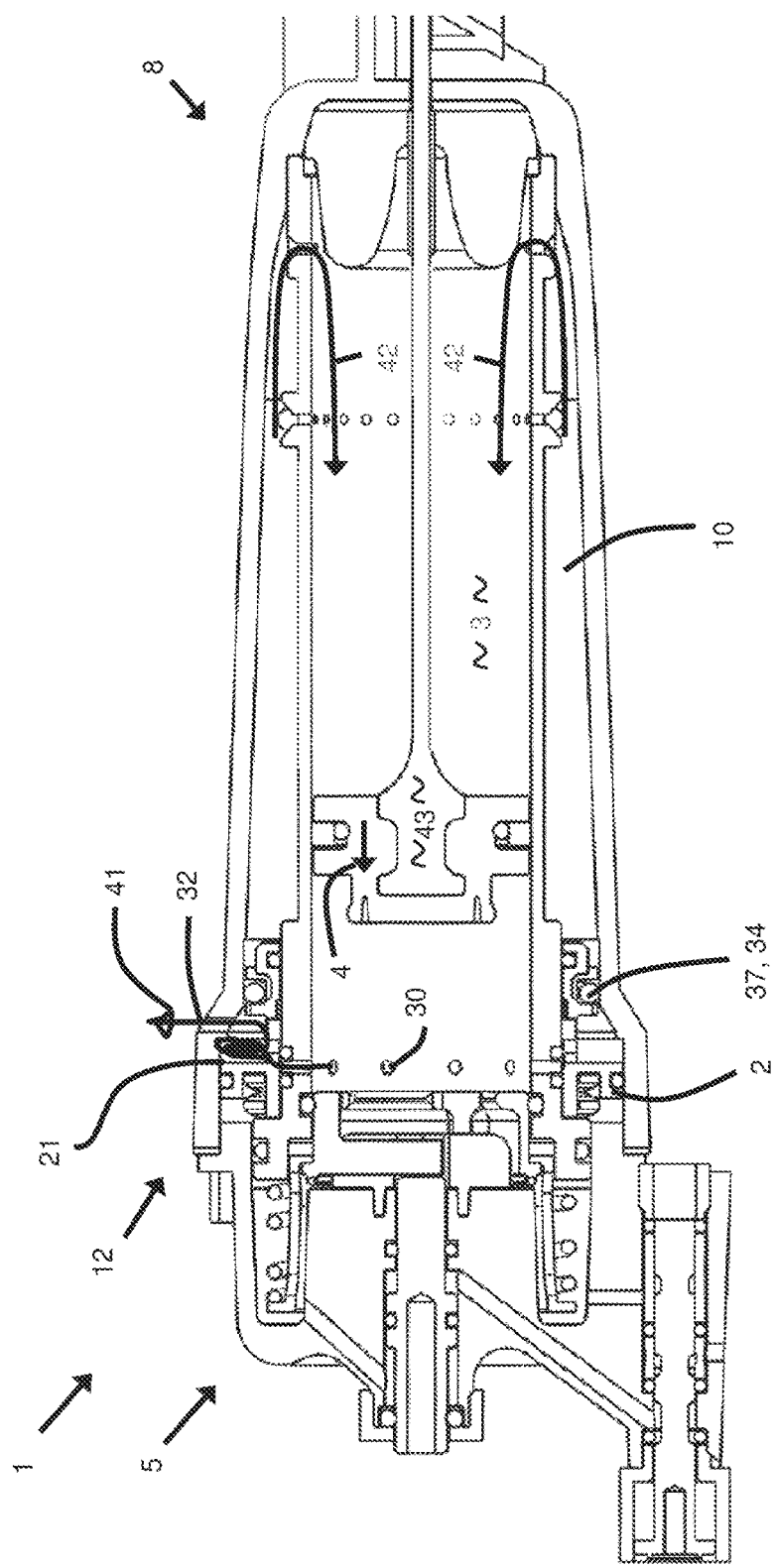
FIG. 6 shows a similar view to that of FIG. 5, where the exhaust valve is open, and is held open by pressure in the exhaust chamber acting against its closing bias, to allow exhausting of the working chamber.

There is a one way valve 19 from the working chamber to the 3 to the return chamber shown at least in FIGS. 2, and 5. The one way valve opens when exposed to any residual pressure behind the work load 4, such as when the work load 4 has travelled to, or towards, the second end 8 as shown in FIGS. 2 and 5. If there is any residual pressure then this will be allowed to pass, via the one way valve 19 from the working chamber 3 into the return chamber 10. Thus the device can capture and utilise any pressure present that has done work on moving the work load to or toward the second end, to return the workload 4 to the first end 5.

In a perfectly sealed system theoretically this should not occur. However, in reality it may occur if there is a bleed of air, for example from in front of the front surface 7 from the anvil port 45 as the workload travels down toward the second end, for example through leakage of seals there or in other places to ambient or atmosphere or similar. Such a check valve 23 would be utilised if there is an undesired pressure imbalance that would act to hinder the work load returning.

A further variation of the exhaust valve, incorporating the one way valve or check valve 23 is shown in FIGS. 4 through 11. In this variation the one way valve is built into the exhaust valve 2, and in effect allows again allows recirculation into the return chamber 10.

Figure 3:
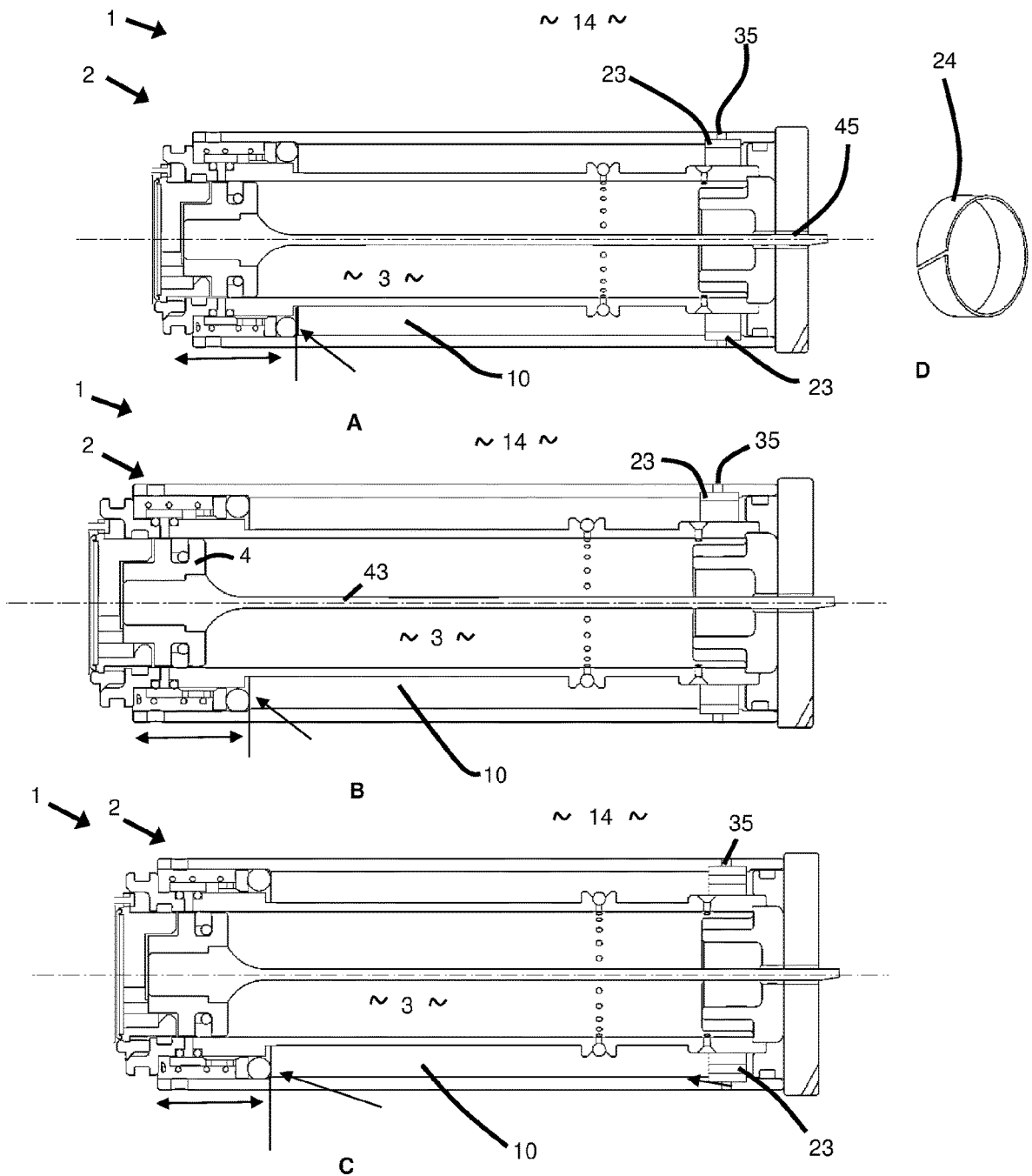
Figure 9:
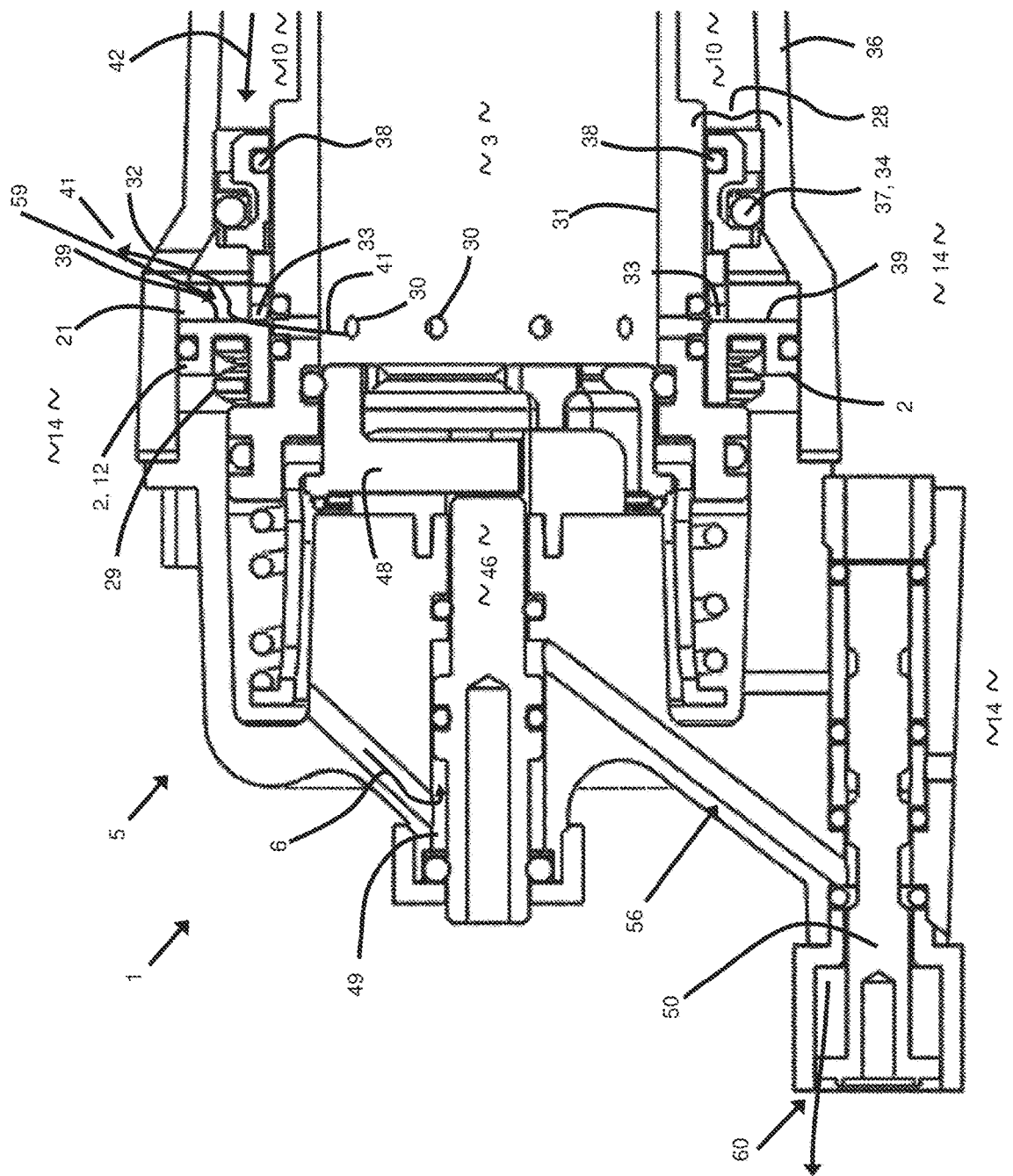
FIG. 9 shows a close up of the exhaust valve of FIG. 5, showing the exhaust valve open (the workload is not visible as it is down the working chamber), the exhaust chamber, and the exhaust flow path, and the dose valve, hammer and trigger for the hammer.
Figure 10:
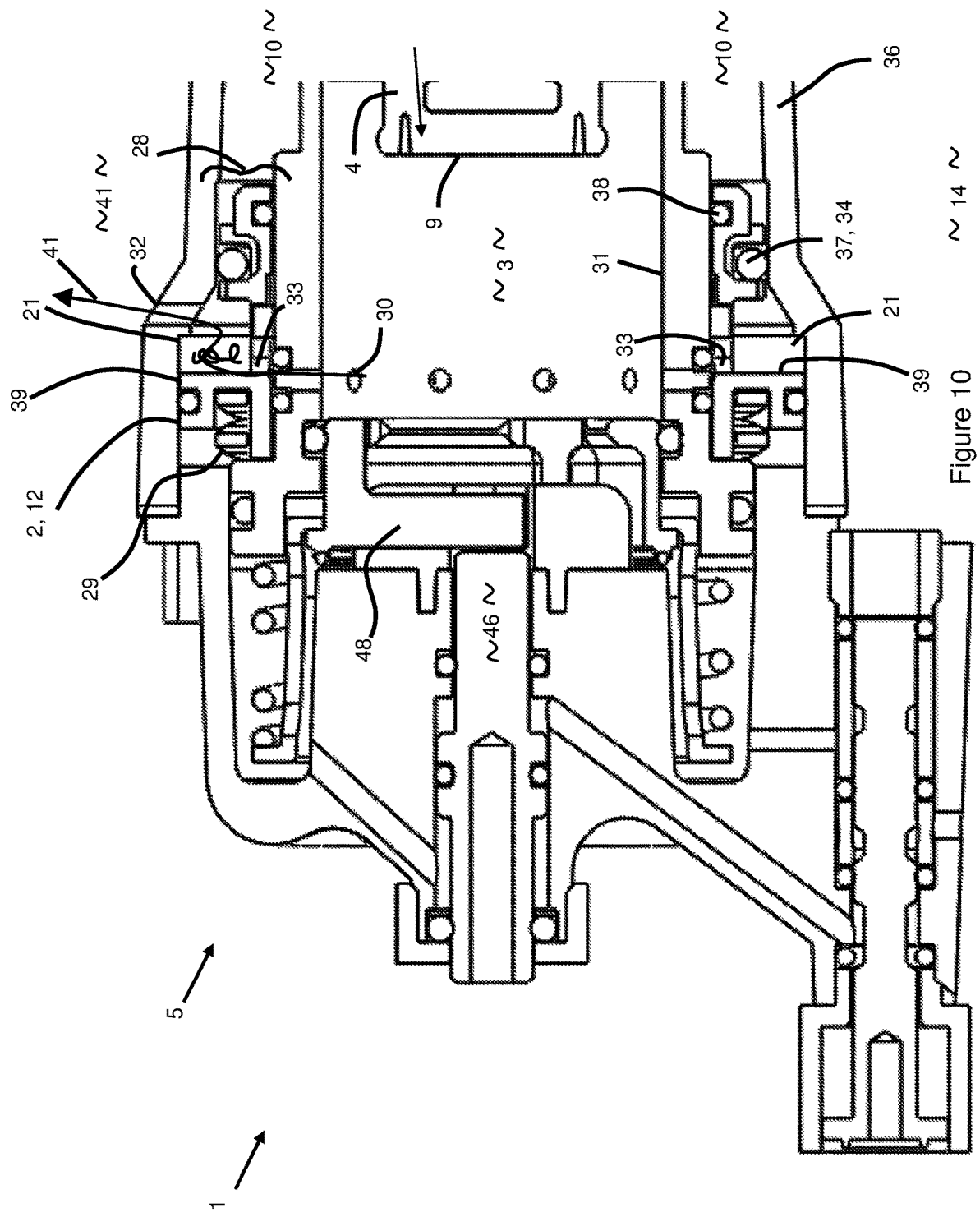
FIG. 10 shows a close up of the exhaust valve of FIG. 6, showing the exhaust valve open still, and held open by the pressure in the exhaust chamber, and the dose valve, hammer and trigger for the hammer.

The general architecture of the variation shown in FIGS. 1 through 3 is retained, the exhaust valve 2 (with cross-section lines (to add in FIG. 4) has an exhaust chamber 21 when moving to, and when in, the open position 12 as shown in FIGS. 5, 6 9, and 10. The exhaust chamber 21 is in fluid connection with the exit 30 in the side wall 31 of the working chamber 3 via the exhaust valve port 33 when the exhaust valve 2 opens 12, such as shown in FIG. 9. The exhaust chamber 21 has a leak path, or flow difference to the exhaust 32 as shown in FIGS. 9 and 10. This flow path difference between into and out of the exhaust chamber 21, or the leak path therefrom, is tuned to create enough pressure in the exhaust chamber 21 to overcome the bias 29. In the situation where the bias 29 has a very low spring constant, then the path difference, or leak path only needs to also be small to general sufficient force.

Thus, when the exhaust valve 2 is actuated to be open, the working fluid, which otherwise would be trapped between the rear surface 9 and the working chamber 3, can now exhaust the working chamber 3 as the workload 4 returns to the first end 5.

The actuation of the dose valve 48 to deliver the working fluid from the dose chamber 52 to the working chamber for these variations will now be described with reference to FIGS. 8 through 11. The actuation of the dose valve 48 that dumps the pressurised working fluid 6 from the dose chamber 52 into the working chamber 3 to drive the workload 4 is as follows, seen in FIGS. 4 through 11, and in particular FIGS. 8 through 11, and is controlled by the trigger valve 50.

The device has a pressurised fluid (e.g. working fluid 6) driven hammer 46. The hammer 46 can slide linearly, in this case again, parallel with the longitudinal axis 15, as shown when FIGS. 8 (hammer 46 all the way to the left) and 9 (hammer 46 moved to the right) are compared.

When looking at FIG. 9 it can be seen that on the left side of the hammer 46 there is a driven chamber 49, and to the right of the hammer 46 there is a dump chamber 47. The two chambers are separated by a hammer piston 51, which substantially seals the two chambers from each other preventing flow of working fluid from one chamber to the other.

The driven chamber 49 is charged from the dose chamber 52 via port 57. Port 57 may be modified with a restricting element, baffle or other restricting geometry (e.g. small drill hole) to restrict flow from the dose chamber 52 to the driven chamber 49.

The dump chamber 47 is charged from the dose chamber 52 also, via a path from the dose chamber 52, through port 58, through the trigger valve 50, up dump passage 56. The trigger valve 50 therefore selectively charges and discharges the dump chamber 47. The trigger valve 50 has o-rings as shown spaced by spacers 61 that allow flow at least between their inner diameter and their outer diameter.

The hammer 46 is held in place by a balanced force acting on the hammer 46. This force balance is achieved by varying pressures or areas in the driven chamber 49 and dump chamber 47, whether aided by any springs, accounting for any frictional forces also.

Figure 8:
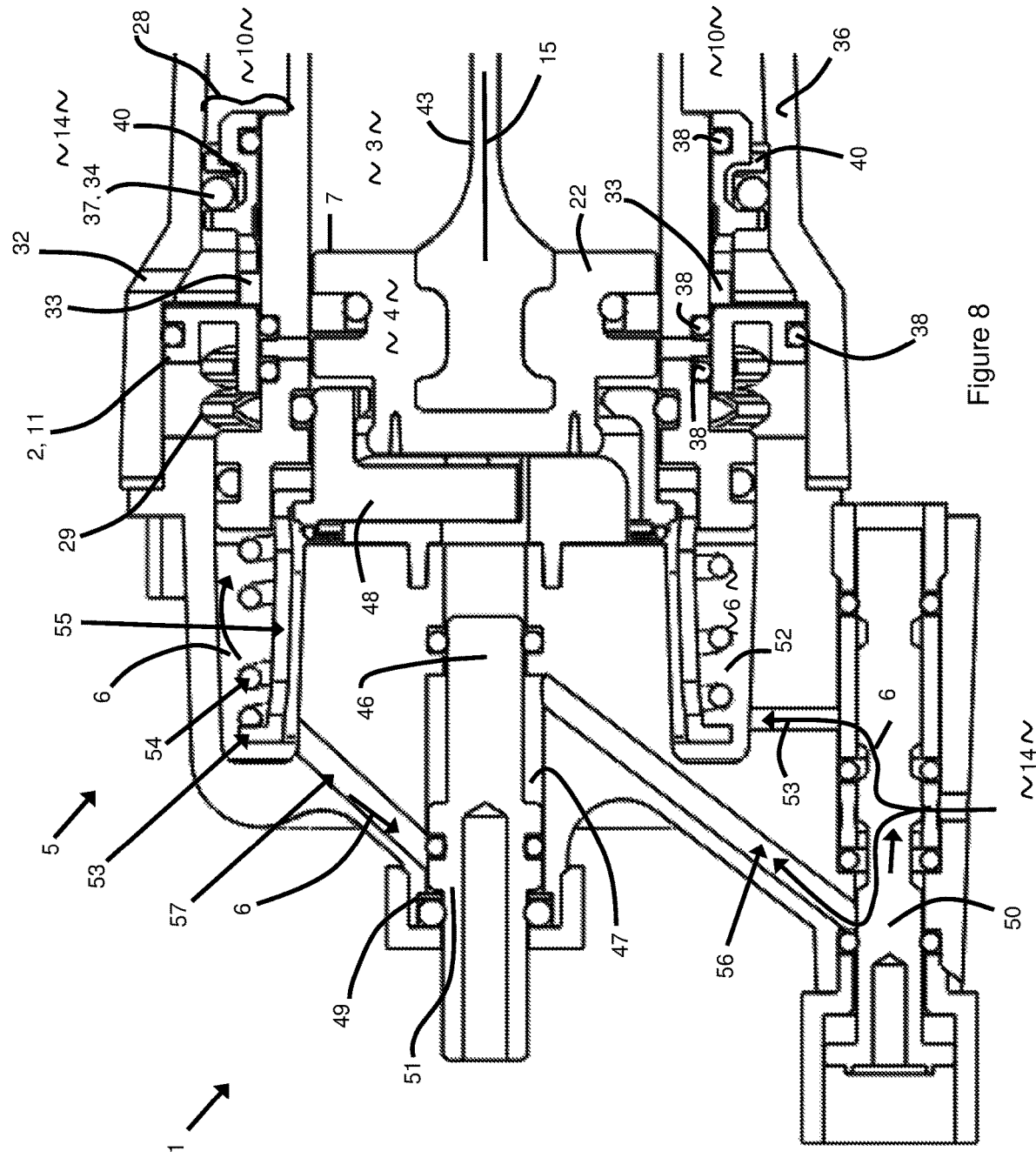
FIG. 8 shows a close up of the exhaust valve of FIG. 4, showing the exhaust closed, and the workload in the ready position, and the dose valve, hammer and trigger for the hammer.

In FIG. 8 the device is ready to fire. The dose chamber 52 is filled with high pressure fluid and is ready, this pressure in the dose chamber 52 coupled with cage spring 54 holds the dose valve shut and seated.

The dose valve 48 is normally biased closed by a combination of, or exclusively by pressure or spring force. In cases where spring force is used to close the dose valve 48 that spring force is transferred to the dose valve 48 via an encircling element called the spring cage 53. At one end the spring cage 53 captures a cage spring 54 which is in compression and biases the spring cage 53 to the right when seen in FIG. 9.

The spring cage 53 may be part of or separate to the dose valve 48.

The opposing end of the spring cage 53 engages the dose valve 48. In this case the spring cage under engages the dose valve 48 to transfer the cage spring 53 bias, to help close the dose valve 48.

The spring cage 53 extends to the left as seen in FIG. 9 of the dose valve 48 into the dose chamber 52 to allow sufficient spring length to provide the correct closing force and travel distance for the dose valve 48. This length may be tuned as needed to vary the closing force. The spring cage 53 features porting 55 to allow for uninhibited flow from the dose chamber through the dose valve opening into the working chamber.

The hammer 46 is triggered by dumping the pressure in the trigger chamber 47, via dump passage 56 to low pressure (for example by trigger valve 50, in this case a spool valve), for example atmosphere or ambient 14 of the working fluid 6 as seen in FIG. 8. The trigger valve 50 may be actuated by a user, for example actuating a trigger, or by other means to drive the trigger valve 50. In this case the trigger drives the trigger valve 50 to the left in FIG. 9 to dump the trigger chamber 46, via dump passage 56.

Once the trigger chamber 47 is evacuated the "firing" sequence has begun. Dumping the trigger chamber 47 creates a pressure differential between the driven chamber 49 (higher) and the trigger chamber 47 (dumped to low pressure, e.g. ambient or atmosphere).

The pressure from the driven chamber 49 then drives the hammer 46 to impact the dose valve 48 which then momentarily opens the dose valve 48 to allow a charge of working fluid 6 from dose chamber 52, to enter into the working chamber 4 to in turn drive the workload 4. This has beneficial impacts on the available performance of the tool, both in terms of efficiency and packaging.

The hammer 46 may then be returned to a ready to fire (the dose valve 48) by returning the equal pressure for force resultant between the trigger chamber 47 and the driven chamber 49.

In addition the hammer 46 may also, at least in part, be driven by a spring (not shown) toward the dose valve 48, or a spring (not shown) to help it return away from striking the dose valve 48. There may also be an elastic energy exchange between the hammer 46 and the dose valve 48, such that that hammer 46 bounces back.

When the trigger valve 50 is allowed to move back to the right, the dump valve 47 is re-pressurised to help move the hammer 46 back to the ready to strike position and the trigger system is now reset.

High pressure pneumatic tools frequency require a method to 'make safe'. The trigger 50 of the present invention incorporates both the 'make safe' energy release function as described below, and the triggering 'firing' function, as described above into a single movable body or valve assembly, movable in one direction to achieve triggering and the opposite direction to achieve making safe.

The trigger valve 50 is a double action pneumatic trigger—pushing to the right (as seen in FIG. 8) dumps the working fluid 6 from the dose chamber 52 via port 58 to a lower pressure safe location, for example atmosphere or ambient 14 as shown, to make the device safe, for example when used in a fastening tool such as a nail gun. In this way the "charge" of working fluid, as highly compressed air, is removed from the dose chamber 52 such that even if the dose valve 48 is opened there is no charge to drive the work load 4.

However, pulling the trigger valve 50 to the left (as seen in FIG. 9), will dump the working fluid from the trigger chamber 47 to then fire the device 1. The trigger valve 50 may have a leak path 60 to the left, acting on the trigger valve 50 as shown to increase the speed of action of the trigger valve opening.

Figure 4:
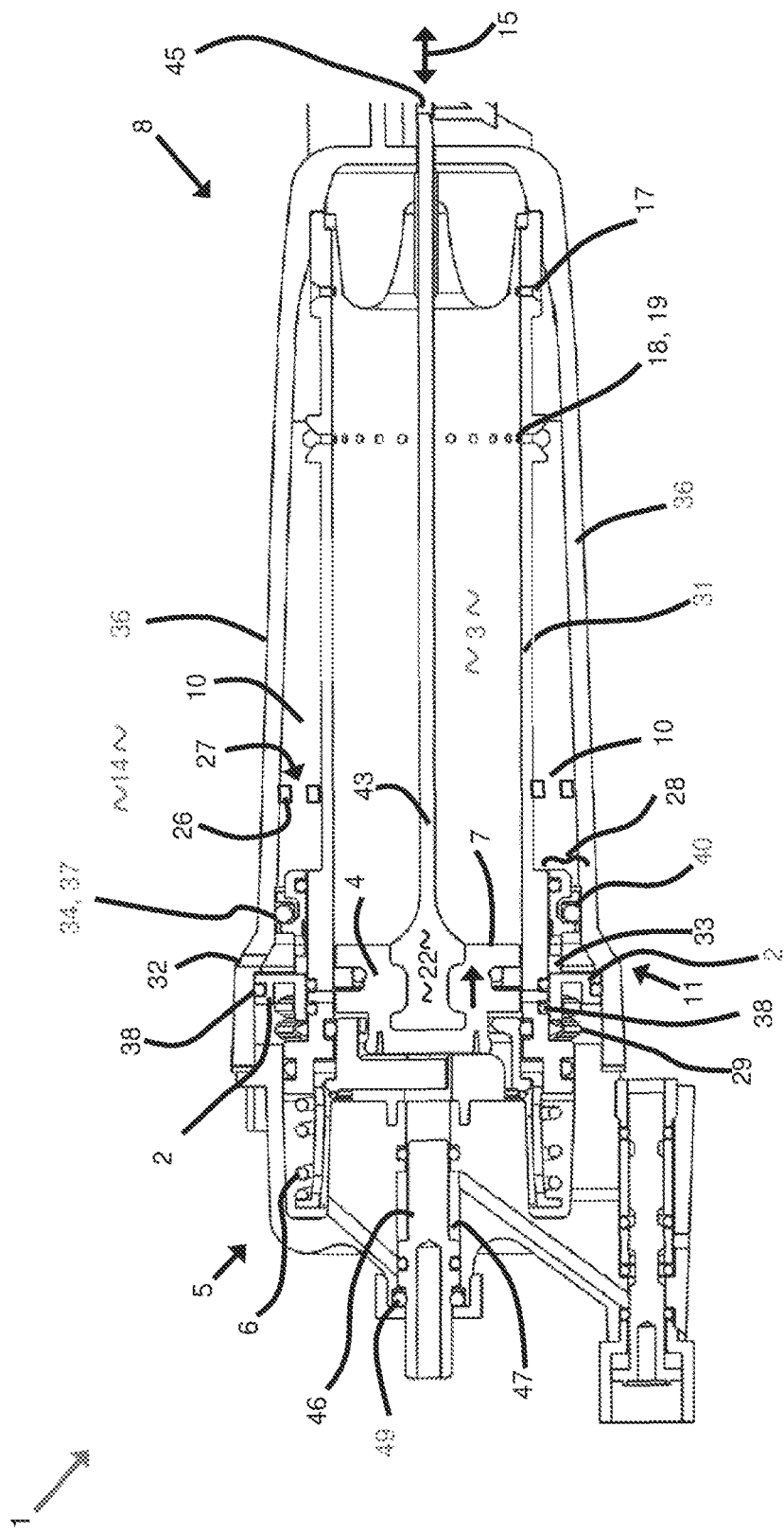
FIG. 4 shows a similar view of a vertical cross section along the longitudinal axis of an air engine of the present invention showing a further variation of the exhaust valve which incorporates the check valve, the air engine being in a ready state, the exhaust valve closed, and the work load ready to be energised.

For the exhaust valve 2 in FIG. 4 there is shown a baffle 26, and baffle port 27 in the return chamber 10. These are used to tune the rate at which the pressure builds up against the working face 28 of the exhaust valve 2. Under dynamic loading the pressure on the second end 8 side of the baffle 26 will build much faster than on the first end 5 side of the baffle due to the reduction in flow path size by the baffle port 27 in the baffle 26, when flow or pressure is coming in from first fluid connection 17. The smaller the baffle port 27 the slower the pressure build of the return fluid 42 against the working face 28.

The working face 28 of the exhaust valve 2 in this embodiment is in part formed by a valve member 37, in this case an o-ring 34. However, valve member 37 may be any other suitable sealing arrangement that can seal and unseal for example, but not limited to an x-ring, lip seal, or other continuous or variable cross section sealing element. When the pressure difference is higher in the return chamber 10, due to return fluid being pushed therein by travel of the workload down the working chamber toward the second end 8, it acts on the working face 28, that is valve member 37, in this case an o-ring 34 to move it to seal off the inter-chamber port 40 as seen in FIG. 8. In doing so the force difference between the return chamber 10 and that present on the exhaust valve 2, for example by the bias 29, will cause the exhaust valve 2 to translate and move to, or toward an open position 12 (that is to the left in the Figures as drawn), to assume an open position as seen in FIG. 9. In opening the exhaust valve 2 forms the exhaust chamber 21 as described above, between the exhaust valve chamber face 39, and lower surface 59 of the exhaust valve 2 and the surfaces of the surrounding housing 36. The exhaust chamber face 39 and its opposing face of the housing 36 form working surfaces on which pressure can act to slide the exhaust valve 2 open, and or retain it open 12— it is the normal of these surfaces, parallel to the sliding direction of the exhaust valve 2, that form the working surfaces to actuate the exhaust valve 2, and keep it open. In this case these working surfaces are clearly perpendicular to the sliding direction of the exhaust valve 2. However, in other forms the surfaces may not be so clearly aligned, yet will still have effective surfaces that are at the normal to the sliding direction, which in this case is the major axis 15, but is not necessarily so in other orientations.

The size of the working face 28, and the exhaust valve chamber face 39 of the exhaust valve 2, are tuned such that the exhaust valve 2 will stay open due to the pressure in the exhaust chamber 21, even if the pressure in the return chamber 10 reduces to below what would otherwise open the exhaust valve. The pressure in the exhaust chamber 21 can act to hold the exhaust valve 21 open, and potentially cause it to open further if necessary. The tuning may also be achieved by the seals 38 used front and back, and on the inner and outer diameter of the exhaust valve 2 to create different sized areas for the pressures to work on thus creating differing sizes forces to operate the exhaust valve 2. The friction level of the seals 38 may also be used to aid in tuning.

The exhaust valve 2 again is normally biased closed by a bias 29, in this case a spring. The bias is selected based on the pressures experienced in the return chamber 10, and those experienced in the exhaust chamber 21, such that the exhaust valve 2 opens, remains open, and then closes as needed for the timing of the device.

The exhaust valve 2 as shown is sealed on its outer and inner circumferences by seals 38, in this case as shown o-rings, but these may be any suitable sealing member and material.

When the device 1 is fired a supply of highly pressurised working fluid 6 is briefly supplied to the rear surface 9 of the workload 4 from the first end 5, for example by a dose valve 48 opening. This sends the workload 4 down toward the second end 8 of the working chamber, as indicated by the arrow in FIG. 4.

The exhaust valve 2 in this variation again is ring shaped, and has at least one, and preferably several apertures through from its inner periphery to its outer periphery to form the exhaust valve ports 33.

The exhaust valve 2 also has an exhaust valve chamber face 39 as seen in FIG. 9. Normally when the pressure difference on the working face 28 is not sufficient to totally overcome the bias 29 then the exhaust valve would close. However, the pressure difference and fluid flow into the exhaust chamber 21, and out, restricted by the leak path, acting on the exhaust chamber 21 and exhaust valve chamber face 39, will build pressure and hold the exhaust valve 2 in the open position 12. Thus any pressure difference on the rear surface 9 of the workload 4 will continue to be allowed to evacuate as the workload 4 moves to the ready position at or toward the first end 5.

With the continued movement of the workload 4 up the working chamber 3 toward the first end 5 there is an ability for the return chamber 10 pressure to fall below that of the pressure on the rear surface 9 of the workload 4. This is most likely evident toward the end of the stroke of the workload 4 toward the first end 5, potentially as the exhaust valve 2 moves towards a closed 11 condition. In this situation there will be a pressure difference between the exhaust 33, for example atmosphere or ambient 14, and the return chamber 10. In this situation the valve member 37 will open to allow fluid 42 to transfer into the return chamber 10 via the inter-chamber port 40 as shown by the arrow in FIG. 11. This will thus further aid return of the workload 4 to the ready position.

To provide lower friction levels the valve member 37, for example when an o-ring 34 or other suitable shape, seals only when moved by the flow of the fluid pushing it into position and compressing it so that it closes off a pathway, statically with no pressure difference or flow the valve member 37 is not sealing and thus provides little or no friction.

The method of operation will now be clarified.

The embodiment in FIGS. 1 through 3 operate in the same way, including the exhaust valve, with the addition of recirculation using the chamber port 35 and check valve 23 as a reed valve 24 in FIGS. 3A through D. FIGS. 4 through 11, operate on the same principles with the recirculation provided within the exhaust valve itself. The direction of movement in each Figure is shown an arrow on the workload 4.

On triggering by an external mechanism, a pressurised supply of working fluid 6, for example but not limited to a gas such as air, is supplied to the rear surface 9 of the workload 4 in the working chamber 3, as shown in FIGS. 1 through 11. The supplied portion of working fluid 6 expands into the rapidly forming volume formed by the working cylinder 3 and workload 4 as the workload is forced, by the working fluid 6, down toward the second end 8. As the workload 4 moves down the working chamber 3 air or similar fluid, on front of the front surface 7 is forced down the working chamber. As a result this fluid, termed for convenience here as return fluid 42, enters the return chamber 10 through either of the first or second fluid connections 17 or 18.

When the workload 4 is captive, as shown in the examples, then the volume defined by the front surface 7 and the working chamber 3 is a closed one. However, if the workload is to be ejected, then the principles will still apply as there will be a pressure wave of fluid in front of the piston as it moves down the working chamber 3. In which case the fluid connection 17 and or 18 are of a different shape, to capture at least in part, some of this return fluid 42.

As the return fluid enters the return chamber it acts on the working face 28 of the exhaust valve 2. The exhaust valve 2 normally biased closed 11 by bias 29, is then forced open once the bias force is overcome by the pressure of the return fluid 42 acting on the working face 28. This is the same for the variations shown in FIGS. 1 through 11.

The exhaust valve 2 then moves to, or toward the open state 12. The build-up of pressurised fluid in the blind volume of the return chamber 10 then returns to the working chamber 3 and acts to push the workload 4 back up the working chamber and return it from the second end 8, to the first end 5.

The workload 4 can now start to move freely back up the working chamber 3 toward the first end 5. Where otherwise the volume defined by the working chamber 3, rear surface 9, and first end 5 would cause a pressure build up, resisting movement of the workload 4, as it moves to the first end 5, the exhaust valve is now open 12, and there is a path for that pressure to exhaust through to a lower pressure, for example atmosphere or ambient 14. However, any low pressure may well be suitable.

The exhaust valve 2 as described earlier provides a flow path to a low pressure, as shown in FIGS. 2, 5, 6, 9, and 10 as exhausting fluid 41. To be clear the fluid exhausted is not combustion gas, but rather is just the working fluid 6 that has expanded from its high pressure, into the working chamber 3 volume and done work on the workload 4.

In FIGS. 1 and 2 this open exhaust pathway for exhaust fluid 41 may be sufficient for the workload 4 to return to the ready position at the first end 5.

However, in some situations, a low pressure may occur in the return chamber 10, preventing full return of the workload 4 to the first position 5.

In this case the variations of FIGS. 3A-D, and 4 through 11 can be used that allow recirculation.

In FIGS. 3A-D, if a low pressure occurs in the volume of the return chamber 10, and that defined by the working chamber 3, second end 8 and front face 7, then there is the chamber port 35 with its check valve 23, shown as a reed valve 24. The check valve will open at the designed pressure difference between external of the return chamber 10, for example low pressure area, such as atmospheric or ambient 14, and allow recirculation to reduce the pressure differential to the rear surface 9, thus allowing movement of the workload consistently and fully to the first end 5.

The variation in FIGS. 4 through 11 operates on a similar principle where the valve to allow re-circulation into the return chamber 10 is incorporated into the exhaust valve 2, with an extended ability to hold the exhaust valve 2 open.

The variation of FIGS. 4-11 again has the exhaust valve 2 opened 12 by the return fluid pressure 42 in the return chamber 10 acting on the working face 28 of the exhaust valve 2. The working face 28 is in part defined by the mobile valve member 37, which in this case is an o-ring 34 that can move to seal the working face 28, and unseal it (described below). When sealing the working face 28, the o-ring 34 also then provides pressure on the exhaust valve 2 to move it to, or aid in helping it stay in, an open position 12.

As the exhaust valve 2 moves to the open position 12 it defines between its exhaust valve chamber face 39 and the interior of the housing an exhaust chamber 21. When open 12, the working fluid can pass through the exits 30, through the exhaust valve port 33 into the exhaust chamber 21, and then via a restriction or leak path, to the exhaust 32. The restriction, or leak path out of the exhaust chamber 21 is of lower flow rate than the flow rate into the exhaust chamber 21, thus creating a pressure that aids in helping keep the exhaust valve 2 open 12.

The flow path from the side wall exits 30 to the exhaust chamber 21, and then from the exhaust chamber 21 to the exhaust 32 may be throttled, for example by the leak path, or another restriction, to have a differing flow capacity into the exhaust chamber, then from the exhaust chamber. This baffling or restriction allows pressure to build up in the exhaust chamber 21 and also slows its release to aid tuning of how long the exhaust valve 2 stays open.

The workload 4 is then able, under action of the return fluid 42, as earlier described, to move back up the working chamber 3 to the first end 5.

To increase the open time of the exhaust valve 2, and allow further tuning options for opening and closing, the pressure built up in the exhaust chamber 21, and more specifically acting on the exhaust valve chamber face 39 and its opposing faces continues to hold the exhaust valve open, even after the pressure in the return chamber has reduced such that the exhaust valve 2 would otherwise close 11. This increases the exhaust valve open time and thus increases the ability for the work load 4 to consistently return to the first end.

Figure 7:
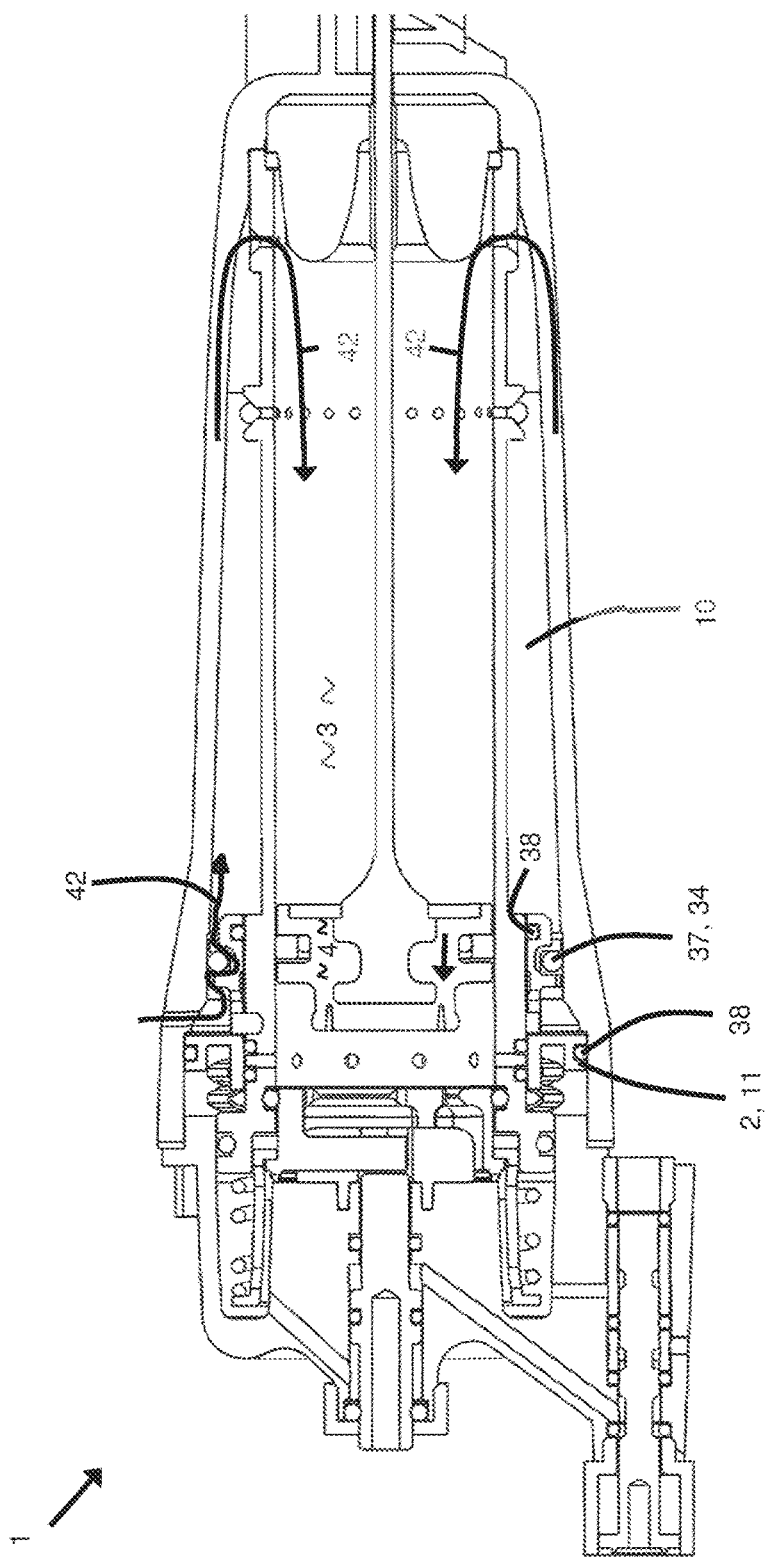
FIG. 7 shows a similar view to that of FIG. 6, but where the one way check valve in the exhaust valve has opened to allow recirculation into the return chamber.
Figure 11:
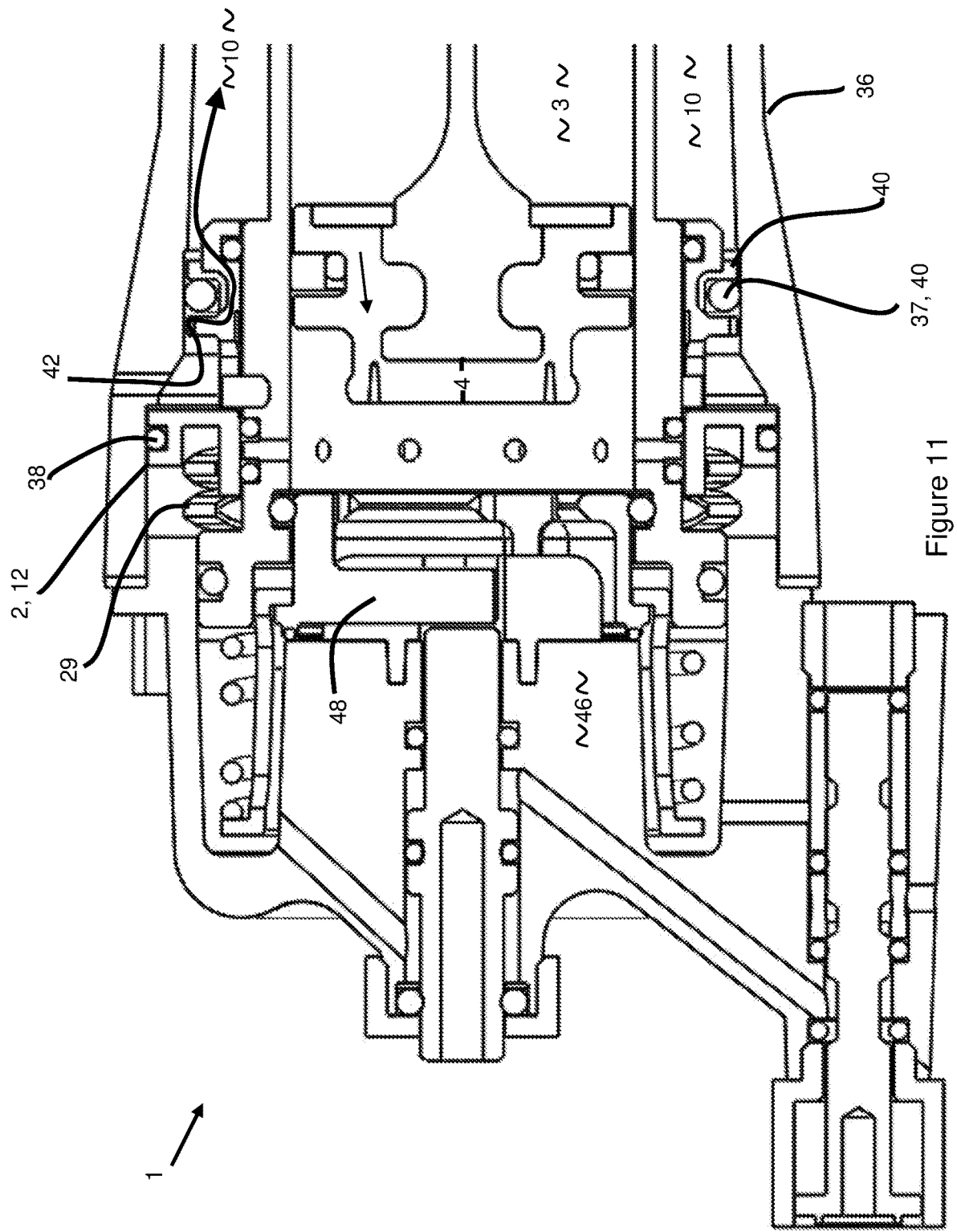
FIG. 11 shows a close up of FIG. 7 showing the exhaust valve open, and where the one way check valve has moved to allow bypass into the return chamber to recirculate and further provide positive pressure in front of the workload to aid it in returning to the ready position, and the dose valve, hammer and trigger for the hammer.

In addition the exhaust valve has an inter-chamber port 40 between the exhaust chamber 21 and the return chamber 10, and preferably between the exhaust 32 and the return chamber 10. This inter-chamber port 40 is, in the preferred embodiment valved by the valve member 37. Thus when there is a pressure difference between the exhaust chamber 21 or exhaust 32 and the return chamber 10 the valve member 37 will open and allow recirculation into the return chamber, to act effectively as a return fluid 42 as shown in FIGS. 7 and 11. Thus even if the exhaust valve 2 has closed, this will further allow the workload 4 to consistently return to the first end 5 and again be ready to work. The port 40 allows working fluid to flow into the return chamber from either the working chamber 21 or ambient.

Moving the exhaust valve 2 to or towards the first end provides ease of assembly and reduced part count. Further having the exhaust as a side exhaust provides reduced complexity when compared to an axial port that must go through parallel to the longitudinal axis 15 at the first end. The result is also a more compact structure with less parts, lower cost to manufacture, and ease of assembly and maintenance.

The foregoing description of the invention includes preferred forms thereof. Modifications may be made thereto without departing from the scope of the invention.

The invention claimed is:

1. A device including an exhaust valve, that operates on a pressurised working fluid, comprising:
    a working chamber, defined at least in part by a side wall, which working chamber can hold a workload to or toward a first end thereof, the working chamber to receive the working fluid to act on a rear surface of the workload to propel the workload to or towards a second end, opposite the first, of the working chamber;
    a return chamber to receive fluid under pressure from a front surface of the workload, the pressure developed at least in part by the movement of the workload towards the second end; and
    an exhaust valve fluidly connected to the return chamber, the exhaust valve normally biased closed preventing working fluid from exiting the working chamber, but on receipt of, and action by, the fluid under pressure from the return chamber, will open to allow the working fluid to exhaust the working chamber to a lower pressure location, the working fluid exhausting via the side wall of the working chamber through to the exhaust valve, wherein the device provided removes or reduces pressure building on the rear surface of the workload when moved from the second end to the first end.

2. The device of claim 1 wherein the exhaust valve exhausts the working fluid at an angle that is not parallel to a longitudinal axis running between the first end and the second end, rather than substantially parallel to the longitudinal axis.

3. The device of claim 2 wherein the exhaust valve slides parallel to the longitudinal axis.

4. The device of claim 2, wherein the exhaust valve is an annular ring that can translate along the longitudinal axis and wherein the ring lies outside the working chamber.

5. The device of claim 1 wherein the exhaust valve defines at least in part, an exhaust chamber along the flow path from the side wall through the exhaust valve, before the exhaust to the lower pressure.

6. The device of claim 5 wherein the working fluid flowing from the working chamber into the exhaust chamber, results in an exhaust chamber pressure which holds the exhaust valve open.

7. The device of claim 5 wherein the fluid connection ports, or the summation of those ports, which connect the working chamber to the exhaust chamber are not of the same size or flow capacity as the ports which connect the exhaust chamber to lower pressure, resulting in different flow capacity into and out of the exhaust chamber.

8. The device of claim 1 wherein a net force acts on the exhaust valve to overcome or increase the bias closed, the net force created from either of both of varying effective pressure areas or pressure, on a first side of the exhaust valve, in fluid communication with the rear surface or a second side of the exhaust valve, in fluid communication with the front surface and wherein the net force varies with time.

9. The device of claim 1 wherein there is a check valve from the lower pressure into the return chamber, wherein the check valve opens if there is a pressure imbalance between the front of the workload and the rear of the workload when the exhaust valve is open.

10. The device of claim 9 wherein the check valve is located in the exhaust valve, between the exhaust chamber and the return chamber.

11. The device of claim 9 wherein the check valve is provided by an o-ring, x-ring, lip seal, or other continuous or variable cross section sealing element, flexible or otherwise, that moves to block flow from the return chamber into the exhaust chamber, but allows flow from the exhaust chamber into the return chamber.

12. The device claim 9 wherein the check valve opens when the pressure in the exhaust chamber exceeds that of the return chamber, in so doing the exhaust chamber pressure can then recirculate and act on the front face of the work load to help drive it back toward the first end.

13. The device of claim 1 wherein the return chamber is located externally of, and surrounding, the working chamber.

14. The device of claim 1 wherein the workload is captive within the working chamber, or is not captive and is expelled from the working chamber, or is a pressure wave within the working chamber to otherwise perform work.

15. The device of claim 1 wherein the exhaust valve is at or towards the first end.

16. The device of claim 1 wherein the return chamber receives the fluid under pressure from the working chamber via at least one fluid connection therebetween, and wherein a first of the at least one fluid connection is at or toward a second end of the working chamber.

17. The device of claim 16 wherein a second of the at least one fluid connection is between the first end and the first fluid connection.

18. The device of claim 17 wherein the second fluid connection includes a one way valve from the working chamber to the return chamber.

19. The device of claim 1 wherein there is a baffle within the return chamber, between a working face of the exhaust valve and the receipt of fluid from the working chamber, and wherein there is one or more apertures in the baffle to slow the development of pressure against the working face compared to the development of pressure on the opposing side of the baffle.

20. A method of providing an exhaust valve in a pressure fluid device, comprising:
  a. driving a working load, within a working chamber, from a first end of the working chamber to or towards an opposing, second end of the working chamber, using a pressurised fluid on a rear surface of the workload,
  b. receiving pressure into a return chamber from a front surface of the workload, the pressure formed at least in part as a result of the workload moving down the working chamber towards the second end,
  c. opening an exhaust valve, as a result of the pressure in the return chamber, acting on a working face of the exhaust valve, the exhaust valve, when opened allowing working fluid in the working chamber present on the rear surface to exhaust from the working chamber to a lower pressure location, the working fluid exiting via the side wall of the working chamber through to the exhaust valve,
  d. thereby allowing a reduced pressure in front of the workload when moving from the second end to, or toward, the first end.

* * * * *